(12) United States Patent
Nakayama et al.

(10) Patent No.: US 11,153,453 B2
(45) Date of Patent: Oct. 19, 2021

(54) IMAGE READING DEVICE AND IMAGE FORMING APPARATUS INCORPORATING SAME

(71) Applicants: Satoshi Nakayama, Kanagawa (JP); Susumu Mikajiri, Tokyo (JP); Hideyo Makino, Tokyo (JP); Yoshinari Onuma, Ibaraki (JP); Kimiharu Yamazaki, Kanagawa (JP); Kohta Aoyagi, Kanagawa (JP)

(72) Inventors: Satoshi Nakayama, Kanagawa (JP); Susumu Mikajiri, Tokyo (JP); Hideyo Makino, Tokyo (JP); Yoshinari Onuma, Ibaraki (JP); Kimiharu Yamazaki, Kanagawa (JP); Kohta Aoyagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/083,458

(22) Filed: Oct. 29, 2020

(65) Prior Publication Data

US 2021/0168253 A1    Jun. 3, 2021

(30) Foreign Application Priority Data

Nov. 29, 2019  (JP) .............................. JP2019-216898

(51) Int. Cl.
*G06F 3/12*     (2006.01)
*H04N 1/00*    (2006.01)
*G03G 15/04*   (2006.01)

(52) U.S. Cl.
CPC ... *H04N 1/00755* (2013.01); *G03G 15/04036* (2013.01); *H04N 1/0057* (2013.01); *H04N 1/0071* (2013.01); *H04N 1/00803* (2013.01)

(58) Field of Classification Search
CPC ............. H04N 1/00755; H04N 1/0075; H04N 1/00753; H04N 1/00758; H04N 1/0057; H04N 1/0071; H04N 1/00803
See application file for complete search history.

(56) References Cited

U.S. PATENT DOCUMENTS

2005/0243382 A1*  11/2005  Wang ....................... H04N 1/38
                                                            358/461
2006/0092617 A1    5/2006  Mikajiri et al.
2006/0203495 A1    9/2006  Mikajiri et al.
2007/0019256 A1    1/2007  Matsui et al.
(Continued)

FOREIGN PATENT DOCUMENTS

JP         8-223416       8/1996
JP        2003-244408     8/2003
(Continued)

*Primary Examiner* — Moustapha Diaby
(74) *Attorney, Agent, or Firm* — Duft & Bornsen, PC

(57) ABSTRACT

An image reading device includes a background member, an illumination unit opposed to the background member, and a reader. The illumination unit emits light to a recording medium having an image thereon. The reader receives a reflection from the recording medium to read the image. The background member has a facing surface that faces the recording medium. The facing surface includes a reference portion on a center portion in a width direction of the background member. The reference portion has a higher reflectance than an end portion of the facing surface in the width direction.

13 Claims, 5 Drawing Sheets

(56) References Cited

U.S. PATENT DOCUMENTS

| | | | |
|---|---|---|---|
| 2014/0063567 A1* | 3/2014 | Ikari | H04N 1/02815 |
| | | | 358/474 |
| 2018/0020108 A1* | 1/2018 | Nakayama | H04N 1/1235 |
| 2018/0364627 A1 | 12/2018 | Kobayashi et al. | |
| 2019/0163112 A1 | 5/2019 | Nikaku et al. | |
| 2019/0202648 A1 | 7/2019 | Nakayama et al. | |
| 2020/0296243 A1 | 9/2020 | Aoyagi et al. | |

FOREIGN PATENT DOCUMENTS

| | | |
|---|---|---|
| JP | 2007-208878 | 8/2007 |
| JP | 2009-164869 | 7/2009 |

* cited by examiner

IMAGE READING DEVICE AND IMAGE FORMING APPARATUS INCORPORATING SAME

CROSS-REFERENCE TO RELATED APPLICATION

This patent application is based on and claims priority pursuant to 35 U.S.C. § 119(a) to Japanese Patent Application No. 2019-216898, filed on Nov. 29, 2019, in the Japan Patent Office, the entire disclosure of which is hereby incorporated by reference herein.

BACKGROUND

Technical Field

Embodiments of the present disclosure relate to an image reading device and an image forming apparatus incorporating the image reading device.

Description of the Related Art

A certain image forming apparatus includes an image reading device. The image reading device optically reads an image formed on a recording medium, such as a sheet, with a light-receiving element. The image reading device includes an illumination unit that illuminates the sheet. In this illumination unit, an amount of light decreases over time. Therefore, in order to suppress variation of a reading level of the image reading device due to the decrease of the amount of light of the illumination unit, the reading level of the image reading device or the amount of light is corrected by a white plate as a reference.

SUMMARY

Embodiments of the present disclosure describe an improved image reading device that includes a background member, an illumination unit opposed to the background member, and a reader. The illumination unit emits light to a recording medium having an image thereon. The reader receives a reflection from the recording medium to read the image. The background member has a facing surface that faces the recording medium. The facing surface includes a reference portion on a center portion in a width direction of the background member. The reference portion has a higher reflectance than an end portion of the facing surface in the width direction.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
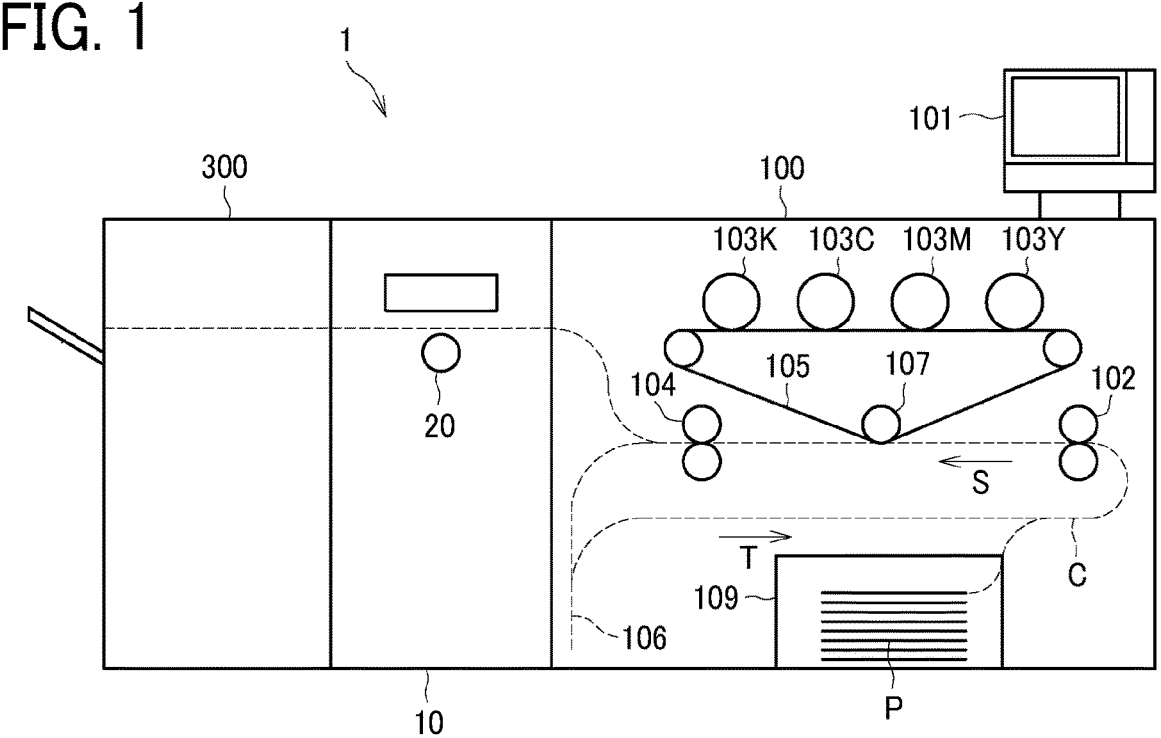
FIG. 1 is a schematic view illustrating a configuration of a printing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals are assigned to identical or corresponding components throughout the drawings, and redundant descriptions are omitted or simplified below as required.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a", "an", and "the" are intended to include the plural forms as well, unless the context clearly indicates otherwise.

It is to be noted that the suffixes Y, M, C, and K attached to each reference numeral indicate only that components indicated thereby are used for forming yellow, magenta, cyan, and black images, respectively, and hereinafter may be omitted when color discrimination is not necessary.

In a comparative example (related art), an image reading device includes a sheet-through glass and a sub-scanning white reference plate. The sheet-through glass is disposed at the position to read a document, and the document moves on the surface of the sheet-through glass. The sub-scanning white reference plate is disposed on the surface of the sheet-through glass and outside an image reading area of the image reading device on one end portion of the sheet-through glass in the width direction of the document. When reading an image on the document, the image reading device reads the sub-scanning white reference plate and adjusts gain of an output level for each pixel based on the read data. In this example, the image reading device can only deal with the variation of the reading level on the end portion in the width direction.

In view of such a situation, an image reading device according to the present disclosure deals with the variation of the reading level in the center portion in the width direction, which is a predetermined area of a background member of the image reading device.

Embodiments of the present disclosure are described below with reference to the drawings. FIG. 1 is a schematic view illustrating an example of a hardware configuration of a printing system 1 according to a first embodiment. As illustrated in FIG. 1, the printing system 1 as an image forming apparatus includes a printing device 100, a sheet reading device as an example of an image reading device, and a stacker 300.

The printing device 100 includes a control panel 101, image forming units 103Y, 103M, 103C and 103K, a transfer belt 105, a secondary transfer roller 107, a sheet feeding unit 109, a conveyance roller pair 102, a fixing roller 104, and a reverse path 106. The image forming units 103Y, 103M, 103C, and 103K construct a tandem electrophotographic image forming configuration. The control panel 101 is a display unit to input various operations for the printing device 100 and the sheet reading device 10 and displays various information on screen.

The image forming units 103Y, 103M, 103C and 103K respectively perform image forming processes to form toner images. Then, the toner images are transferred from the image forming units 103Y, 103M, 103C and 103K onto the transfer belt 105. In the present embodiment, the image forming unit 103Y forms a yellow toner image on the surface of a photoconductor drum thereof, the image forming unit 103M forms a magenta toner image on the surface of a photoconductor drum thereof, the image forming unit 103C forms a cyan toner image on the surface of a photoconductor drum thereof, and the image forming unit 103K forms a black toner image on the surface of a photoconductor drum thereof. The image forming processes include charging, exposure, development, transfer, and cleaning processes. However, the configuration of the image forming units is not limited to the above-described embodiment.

The transfer belt 105 conveys a full-color toner image, which is the toner images transferred from the image forming units 103Y, 103M, 103C and 103K and superimposed on the transfer belt 105, to a secondary transfer position opposite the secondary transfer roller 107. In the present embodiment, initially the image forming unit 103Y transfers the yellow toner image onto the transfer belt 105. Subsequently, the image forming units 103M, 103C, and 103K respectively transfer the magenta, cyan, and black toner images and superimpose the toner images on the transfer belt 105. However, the order of image formation by the image forming units 103Y, 103M, 103C, and 103K is not limited to the above-described example.

The sheet feeding unit 109 accommodates a plurality of sheets (recording media) P piled one on another. The sheet P is a target to be processed and conveyed in the printing system 1. The sheet feeding unit 109 supplies the sheet P accommodated therein to the downstream process in the printing system 1. The conveyance roller pair 102 conveys the sheet P supplied by the sheet feeding unit 109 to the secondary transfer position in the direction indicated by arrow S in a conveyance path C, and the secondary transfer roller 107 collectively transfers the full-color toner image conveyed by the transfer belt 105 onto the sheet P at the secondary transfer position. The fixing roller 104 applies heat and pressure to the sheet P bearing the full-color toner image to fix the full-color toner image on the sheet P.

In the case of single-sided printing, the printing device 100 forwards a printed matter, which is the sheet P on which the full-color toner image is fixed, to the sheet reading device 10. On the other hand, in the case of duplex printing, the printing device 100 forwards the sheet P on which the full-color toner image is fixed to the reverse path 106. The reverse path 106 reverses the front and back surfaces of the sheet P while the sheet P switchbacks in the reverse path 106, and the sheet P is conveyed in the direction indicated by arrow T. After that, the conveyance roller pair 102 conveys the sheet P to the secondary transfer roller 107 again, and the secondary transfer roller 107 transfers another full-color toner image to the surface opposite the surface on which the toner image is previously fixed. Then, the fixing roller 104 fixes the full-color toner image on the sheet P. Subsequently, the sheet P is sent to the sheet reading device 10 and the stacker 300 as a printed matter.

Figure 2:
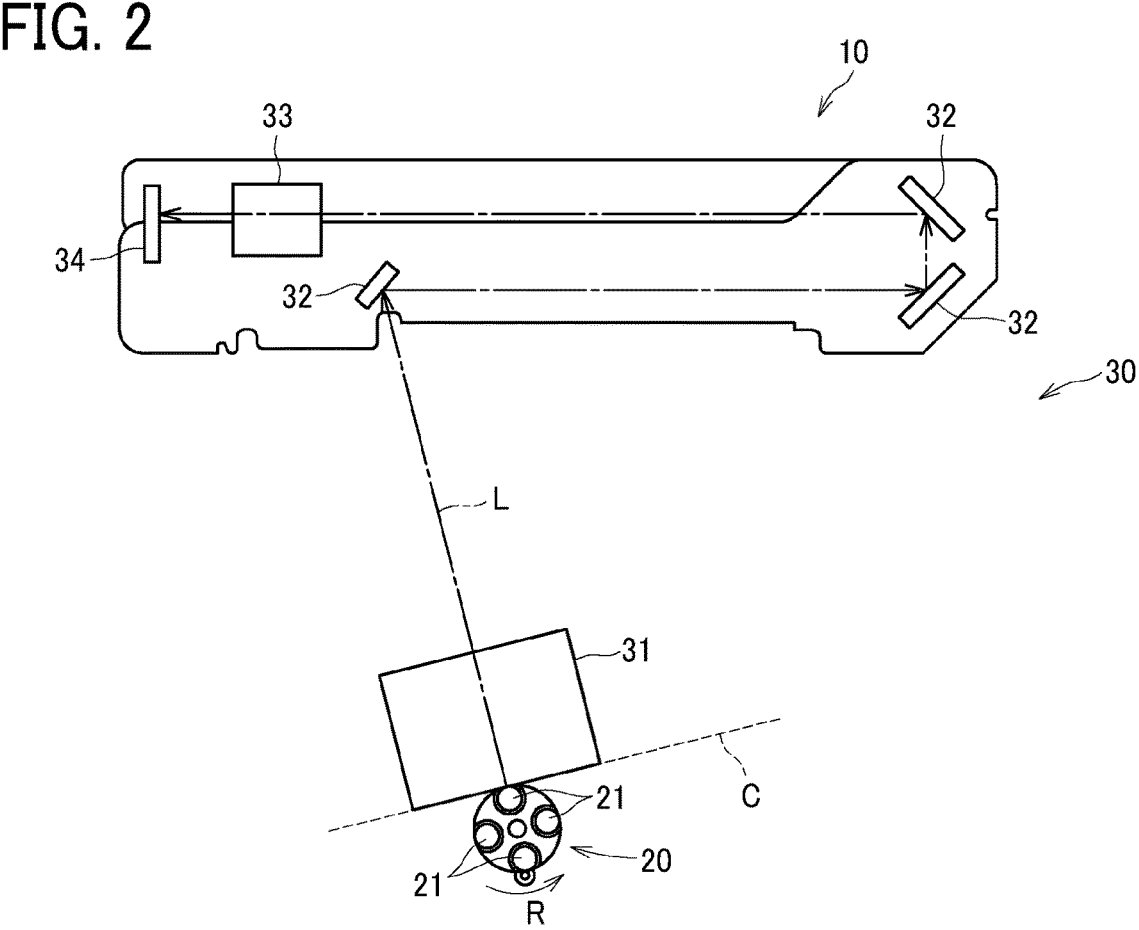
FIG. 2 is a schematic view illustrating a configuration of a sheet reading device according to an embodiment of the present disclosure.

The sheet reading device 10 is described in further detail below. As illustrated in FIG. 2, the sheet reading device 10 includes a revolver 20 as a rotator and a reading unit 30. The reading unit 30 includes an illumination unit 31, a plurality of reflectors 32, a lens 33, and a sensor 34 as a reader. The revolver 20 is rotatable in the direction indicated arrow R in FIG. 2, and includes a plurality of conveyance rollers 21 (four conveyance rollers 21 in the present embodiment) in the circumferential direction of the revolver 20.

The illumination unit 31 is opposed to the revolver 20 via the conveyance path C. The illumination unit 31 emits light to the surface of the sheet P conveyed on the conveyance path C by the conveyance roller 21. A part of the light emitted from the illumination unit 31 is reflected on the sheet P. The plurality of reflectors 32 reflects and directs the reflection to the lens 33. The reflection directed to the lens 33 is focused by the lens 33, and the sensor 34 receives the reflection (see arrow L in FIG. 2).

Figure 3:
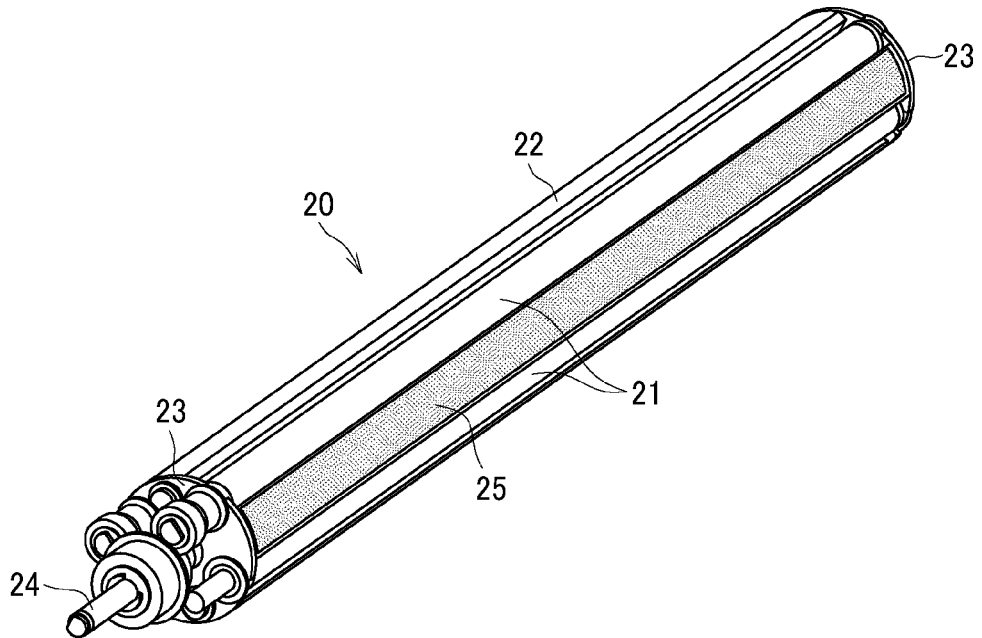
FIG. 3 is a perspective view of a revolver of the sheet reading device illustrated in FIG. 2.

As illustrated in FIG. 3, the revolver 20 includes the plurality of conveyance rollers 21, a holder 22, flanges 23 as supports, a rotation shaft 24, and a white reference plate 25 as a reference. The holder 22 holds the plurality of conveyance rollers 21. The flange 23 has a disc shape. The respective flanges 23 contact both ends of the holder 22 and the conveyance roller 21 in the axial direction of the revolver 20, thereby supporting both the ends.

Figure 4:
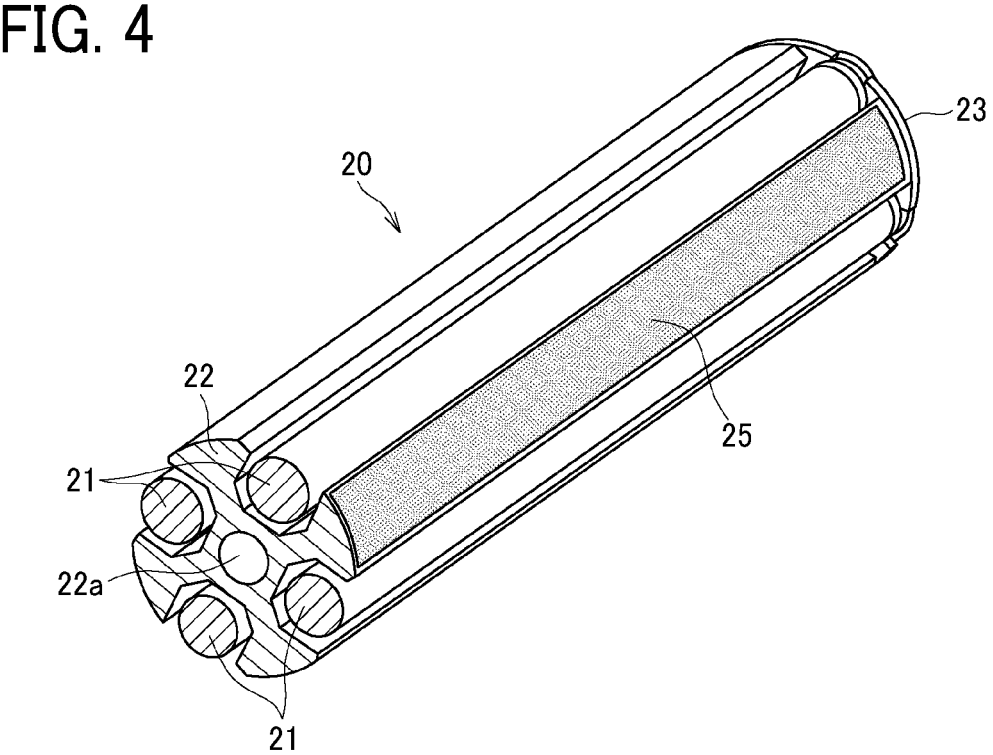
FIG. 4 is a perspective cross-sectional view of the revolver.

As illustrated in FIG. 4, the holder 22 has a substantially cross shape in cross-section. The holder 22 rotatably holds the four conveyance rollers 21 at the four positions between the adjacent bar portions of the cross shape. That is, the holder 22 holds each of the conveyance rollers 21 at the different position in the circumferential direction. Further, the holder 22 has an insertion hole 22a at the center into which the rotation shaft 24 is inserted. The holder 22 includes the white reference plate 25 on a part of the outer circumferential surface of the revolver 20. The surface of the white reference plate 25 is colored in white with a high reflectance of light. The white reference plate 25 is disposed across the entire passage area where the sheet P passes through in the width direction of the sheet P.

The conveyance roller 21 includes a facing surface that faces the sheet P to convey the sheet P. As the conveyance roller 21 rotates with respect to the holder 22, the sheet P conveyed onto the surface of the conveyance roller 21 is further conveyed downstream. The revolver 20 is rotatable around the rotation shaft 24. This rotation of the revolver 20 causes the any one of the conveyance rollers 21 or the white reference plate 25 to face the conveyance path C.

The conveyance roller 21A, which is one of the conveyance rollers 21 included in the revolver 20, is described below with reference to FIG. 5. Note that the conveyance roller 21A serves as a conveyor to convey the sheet P and a background member including a reference portion described later, and the conveyance roller 21 other than the conveyance roller 21A also serves as a conveyor and another background member. In the present embodiment, the center position of the sheet P of each size is aligned with the center position of the conveyance path C as a reference position in the width direction of the sheet P, and the sheet P is conveyed by each conveyance roller 21 in the sheet reading device of the printing system 1. The width direction of the sheet P is the same as the width direction of the conveyance roller 21, the axial direction of the revolver 20, and also the main-scanning direction of the reading unit 30.

Figure 5:
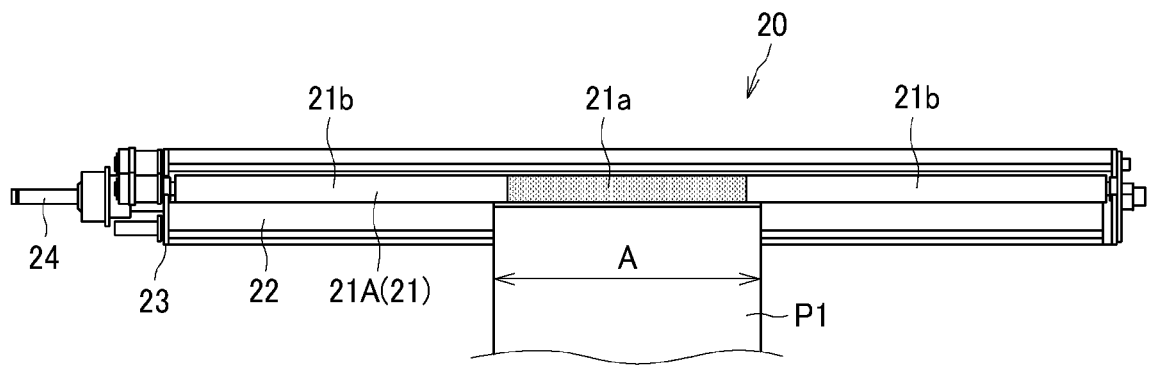
FIG. 5 is a front view of the revolver.

As illustrated in FIG. 5, the conveyance roller 21A includes a white portion 21a (see the hatched portion in FIG. 5) as a reference portion. The white portion 21a is disposed inside a minimum passage area A provided on the facing surface in the width direction on which a sheet P1 having the minimum width passes through in the sheet reading device 10 in the width direction, that is, inside between both ends of the sheet P1 in the width direction. In the present embodiment, the sheet P1 having the minimum width is, for example, a postcard-sized sheet having a width of 100 mm. In the conveyance roller 21, a portion different from the white portion 21a is black portions 21b colored in black, which includes end portions in the width direction of the conveyance roller 21. In other words, the conveyance roller 21 includes the white portion 21a having a higher reflectance of light than the black portion 21b. The white portion 21a is disposed on the center portion of the facing surface, which is a predetermined portion of the background member, and the black portions 21b are disposed on the end portions of the facing surface in the width direction of conveyance roller 21.

Figure 6:
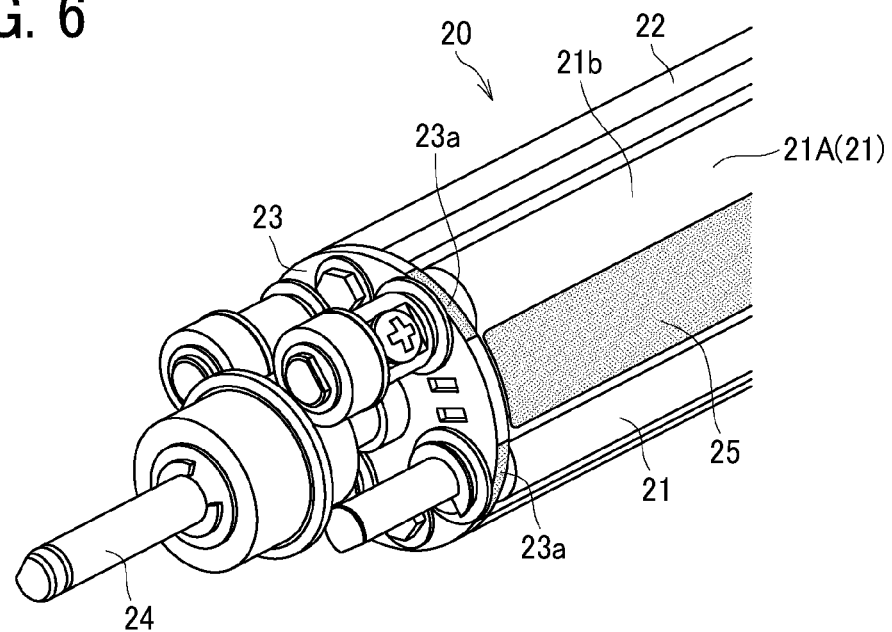
FIG. 6 is a perspective view illustrating an end portion of the revolver in a width direction.

Further, as illustrated in FIG. 6, the flange 23 includes a white portion 23a as another reference portion in a region adjacent to the conveyance roller 21 of the outer circumferential surface of the flange 23. In other words, the revolver 20 includes the white portion 23a, which has a higher reflectance of light than the black portion 21b of the conveyance roller 21A. The white portion 23a is disposed outside the passage area where the sheet P is conveyed in the axial direction of the revolver 20.

Figure 7:
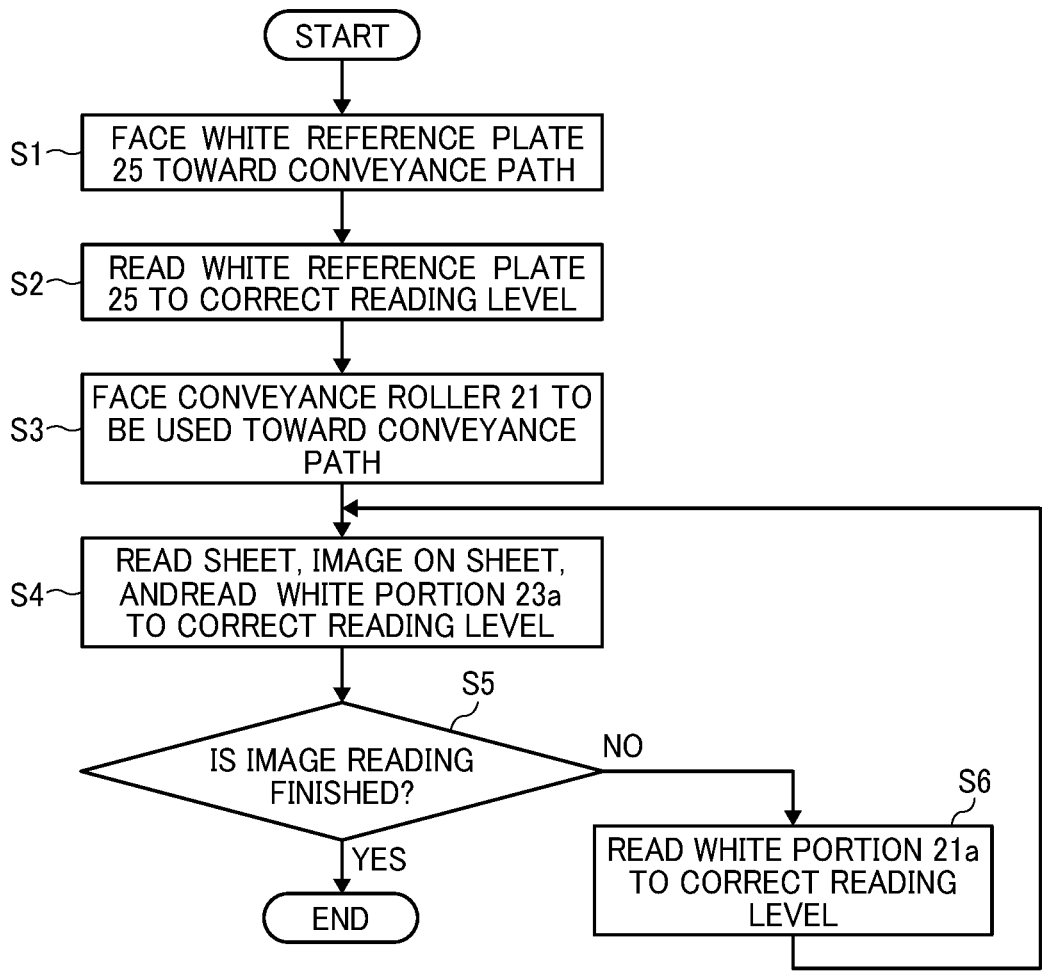
FIG. 7 is a flowchart illustrating processes of reading.

Next, a description is given of a procedure when the sheet reading device 10 reads the sheet P with reference to FIG. 7. First, before the sheet reading device 10 starts reading the sheet P, on which an image is formed, the revolver 20 rotates to face the white reference plate 25 toward the conveyance path C (see step S1 in FIG. 7). The reading unit 30 reads the white reference plate 25, and the sheet reading device 10 corrects a reading level of the image across the entire area in the width direction (step S2).

Then, the revolver 20 rotates to face the conveyance roller 21 to be used toward the conveyance path C (step S3). When the sheet is conveyed to the sheet reading device 10, the conveyance roller 21 conveys the sheet P downstream while rotating. At this time, the reading unit 30 reads the side edge of the sheet P and the image on the sheet P. At the same time, the reading unit 30 reads the white portion 23a of the flange 23, and the sheet reading device 10 corrects the reading level of the image on the end portion of the sheet P in the width direction (step S4).

When the image reading is continued ("NO" in step S5), the reading unit 30 reads the white portion 21a on the conveyance roller 21 in a sheet interval, and the sheet reading device corrects the reading level of the image on the center portion of the sheet P in the width direction (step S6). The sheet interval is a period from when the trailing edge of the preceding sheet P passes to when the next sheet P is conveyed to the conveyance roller 21. The above steps S4 to S6 are repeated until the final sheet P to be read has been conveyed.

As described above, in the present embodiment, the reading unit 30 reads the white reference plate 25 before reading operation of the successive sheets P. In addition, the reading unit 30 reads the white portion 21a of the conveyance roller 21 and the white portion 23a of the flange 23 during the reading operation of the successive sheet P. As a result, the sheet reading device 10 can correct the reading levels of the images on the center portion and the end portion in the width direction. Note that the above-described terms "during the reading operation of the successive sheets P" correspond to steps S4 to S6 in FIG. 7. Therefore, even if the amount of light of the illumination unit 31 (see FIG. 2) decreases over time and the reading level of the reading unit 30 varies, the sheet reading device 10 can deal with the variation in the reading level.

Specifically, the sheet reading device 10 can increases the amount of light of the illumination unit 31 corresponding to the decrease in the reading level of the reading unit 30, or can correct the decrease in the reading value with gain conversion when the reading unit 30 reads an image. In the present embodiment, the sheet reading device 10 uses the gain conversion to deal with the variation in the reading level. As a result, the sheet reading device 10 can deal with the variation in the reading level without increasing the power consumption of the illumination unit 31. In particular, the reading unit 30 reads the white portion 21a of the conveyance roller 21 in the sheet interval and the white portion 23a of the flange 23 when reading the sheet P, so that the sheet reading device 10 can correct the reading level without preventing the reading unit 30 from reading the sheet P in the normal reading operation of the sheet P. Therefore, the sheet reading device 10 can correct the reading level without reducing the speed of the reading operation of the reading unit 30.

Further, the white portion 21a is disposed inside the minimum passage area A where the sheet P1 having the minimum width passes through, and the black portion 21b is disposed outboard of the white portion 21a (see FIG. 5). Therefore, the reading unit 30 can read white portion 21a, and can read the boundary between the sheet P1 and the black portion 21b when the sheet P1 passes through. That is, the sheet reading device 10 can correct the reading level on the center portion in the width direction, and the reading unit 30 can read the position of the side edge of the sheet P1.

Figure 8:
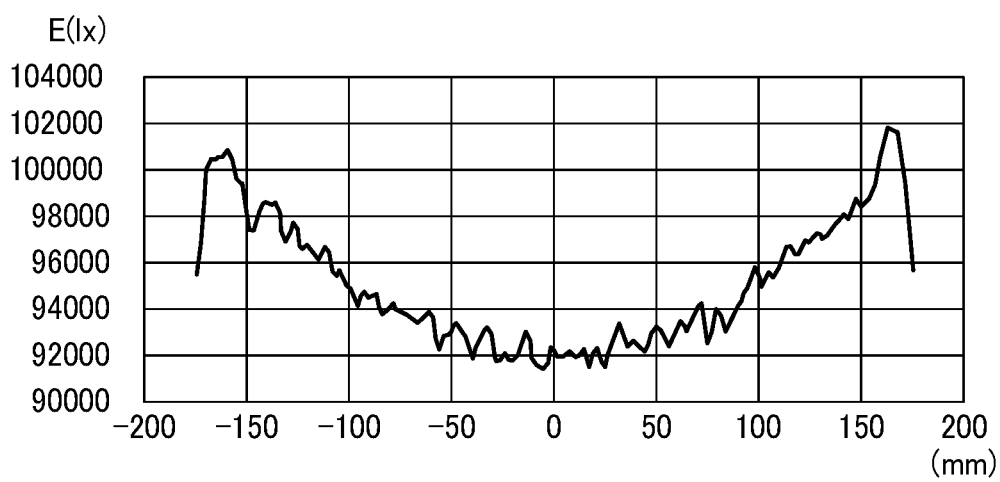
FIG. 8 is a graph of an illuminance distribution of an illumination unit of the sheet reading device in the main-scanning direction.

Next, a description is given of the illuminance distribution of the illumination unit 31 with reference to FIG. 8. FIG. 8 is a graph of the illuminance distribution of the illumination unit 31 in the main-scanning direction (i.e., the width direction of the conveyance roller 21). The horizontal axis represents the position in the main-scanning direction (mm), and the vertical axis represents the illuminance E (lx). The horizontal axis indicates the distance from the center position of the sheet P, which passes through the sheet reading device 10, in the width direction. The center position corresponds to 0. As illustrated in FIG. 8, in the present embodiment, the illuminance on the end portion is larger than the illuminance on the center portion in the width direction. This illuminance distribution can prevent signal-to-noise (S/N) ratio on the end portion from decreasing.

In the above description, among the conveyance rollers 21 included in the revolver 20, the conveyance roller 21A including the white portion 21a on the center portion and the black portions 21b on the end portions in the width direction has been described. However, the revolver 20 includes other conveyance rollers 21, such as a roller having a different surface color (e.g., a white roller) and a roller having a different diameter. As described above, the revolver 20 includes the plurality of conveyance rollers 21 and rotates to face one of the conveyance rollers 21 toward the sheet P conveyed in the conveyance path C. Therefore, the conveyance rollers 21 to convey the sheet P are switchable according to the condition of the sheet P to be conveyed in the sheet reading device 10 or the reading conditions (whether the reading unit 30 reads the image on the sheet P or the position of the side edge of the sheet P).

Figure 9:
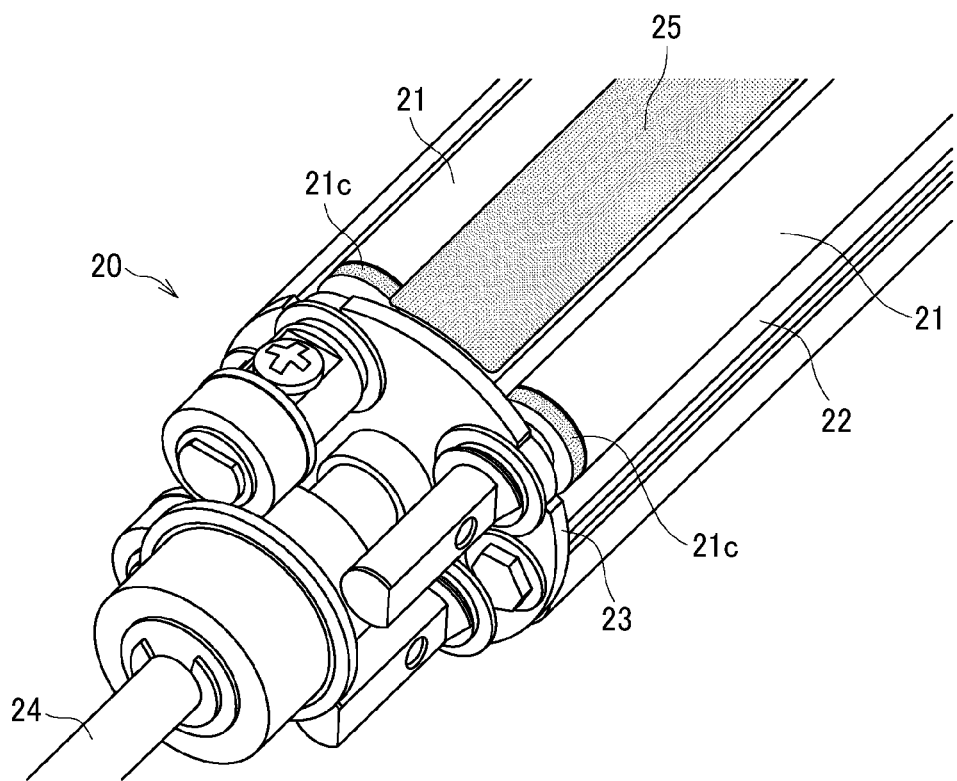
FIG. 9 is a perspective view illustrating a variation of the revolver.

In the above description, the flange 23 includes the white portion 23a for correcting the reading level on the end portion in the width direction (see FIG. 6). However, when the conveyance roller 21 has a sufficient length and extends further outside the passage area of the sheet P, the conveyance roller 21 can include a white portion 21c on the end portion outside the passage area in the width direction as illustrated in FIG. 9.

In the above-described embodiments, the image reading device and the image forming apparatus according to the present disclosure is applied to the printing system 1 including the printing device 100 of the electrophotographic type. However, the present disclosure is not limited to the above-described embodiments, and the image reading device and the image forming apparatus according to the present disclosure can be applied to a printing system including a printing device of inkjet type.

Further, in the above-described embodiments, the image reading device and the image forming apparatus according to the present disclosure is applied to the printing system 1 including the printing device 100 such as a production printing device. However, the present disclosure is not limited to the above-described embodiments, and the image reading device according to the present disclosure can be applied to an image forming apparatus, such as a multifunction peripheral having at least two of copy function, print function, scanner function, and facsimile transmission function, a copier, a printer, a scanner, and a facsimile machine.

In addition to the sheet P (i.e., plain paper), examples of the recording medium include thick paper, postcards, envelopes, thin paper, coated paper, art paper, tracing paper, overhead projector (OHP) transparencies, plastic films, prepregs, and copper foils.

In the above-described embodiments, the background member when the image reading device reads the recording medium is the conveyance roller 21, but the background member is not limited to the above-described embodiments. That is, a background member that does not have a function to convey a recording medium can be used.

In the image reading device according to the above-described embodiments, the center position of the recording medium is aligned with the center position of the conveyance path as a reference position in the width direction of the recording medium. Alternatively, an image reading device with end-based alignment can be used. That is, the conveyance roller such as the conveyance roller 21A may convey a recording medium while the one end of the recording medium of each size is aligned with the end of the conveyance path as a reference position in the width direction of the recording medium. In this case, the white portion 21a (see FIG. 5) is disposed not on the center portion of the conveyance roller 21A as a predetermined portion but inside the minimum passage area of the recording medium having the minimum width, which is available in the image reading device, in the width direction of the recording medium as a predetermined portion. As a result, the white portion 21a can be arranged in the passage area of the recording medium of each size, and the reading level can be corrected in the passage area as described above.

As described above, the image reading device according to the present disclosure can deal with the variation of the reading level on the center portion in the width direction, which is a predetermined portion of the background member.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. An image reading device comprising:
a background member;
an illumination unit opposed to the background member, the illumination unit configured to emit light to a recording medium having an image thereon;
a reader configured to receive a reflection from the recording medium to read the image;
the background member having a facing surface configured to face the recording medium, the facing surface including a reference portion on a center portion in a width direction of the background member, the reference portion having a higher reflectance than an end portion of the facing surface in the width direction; and
a support contacting an end of the background member in the width direction to support the background member, wherein the support includes another reference portion having a higher reflectance than the end portion of the background member in the width direction.

2. The image reading device according to claim 1, wherein the facing surface provides a minimum passage area in the width direction on which the recording medium having a minimum width passes through, and wherein the reference portion is inside the minimum passage area.

3. The image reading device according to claim 1, further comprising a rotator and at least one another background member,
wherein the rotator includes the background member and the at least one another background member, and
wherein the rotator is configured to rotate to face one of the background member and the at least one another background member toward the recording medium.

4. The image reading device according to claim 1, wherein the background member is a conveyor configured to convey the recording medium.

5. An image forming apparatus comprising:
the image reading device according to claim 1; and
an image forming unit configured to form the image on the recording medium.

6. An image reading device comprising:
a background member;
an illumination unit opposed to the background member, the illumination unit configured to emit light to a recording medium having an image thereon;
a reader configured to receive a reflection from the recording medium to read the image,
the background member having a facing surface configured to face the recording medium, the facing surface including a reference portion on a predetermined portion, the reference portion having a higher reflectance than a portion different from the predetermined portion on the facing surface in a width direction of the background member, and the facing surface providing a minimum passage area in the width direction on which the recording medium having a minimum width passes through; and
a support contacting an end of the background member in the width direction to support the background member, wherein the support includes another reference portion having a higher reflectance than the portion different from the predetermined portion.

7. The image reading device according to claim 6, wherein the background member is a conveyor configured to convey the recording medium.

8. An image forming apparatus comprising:
the image reading device according to claim 6; and
an image forming unit configured to form the image on the recording medium.

9. An image reading device comprising:
a background member;
an illumination unit opposed to the background member, the illumination unit configured to emit light to a recording medium having an image thereon;
a reader configured to receive a reflection from the recording medium to read the image;
the background member having a facing surface configured to face the recording medium; and
a reference member that is separate from the background member and located outside the facing surface in the width direction, the reference member having a higher reflectance than the facing surface of the background member in the width direction.

10. The image reading device according to claim 9, further comprising a rotator,
wherein the rotator includes the facing surface and the reference member.

11. The image reading device according to claim 9, further comprising a support,
wherein the support contacts an end of the background member in the width direction to support the background member, and wherein the support includes the reference member.

12. The image reading device according to claim 9, wherein the background member is a conveyor configured to convey the recording medium.

13. An image forming apparatus comprising:
the image reading device according to claim 9; and
an image forming unit configured to form the image on the recording medium.

* * * * *